US008587421B2

(12) United States Patent
Koie

(10) Patent No.: US 8,587,421 B2
(45) Date of Patent: Nov. 19, 2013

(54) IN-VEHICLE EMERGENCY REPORT APPARATUS

(75) Inventor: Yoshio Koie, Handa (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 12/931,448

(22) Filed: Feb. 1, 2011

(65) Prior Publication Data

US 2011/0193695 A1 Aug. 11, 2011

(30) Foreign Application Priority Data

Feb. 10, 2010 (JP) .................................... 2010-27560

(51) Int. Cl.

| | |
|---|---|
| ***B60D 1/28*** | (2006.01) |
| ***B60Q 1/00*** | (2006.01) |
| ***G08G 1/00*** | (2006.01) |
| ***G08G 1/16*** | (2006.01) |
| ***G05D 23/00*** | (2006.01) |

(52) U.S. Cl.
USPC ........... 340/438; 340/436; 340/902; 340/903; 340/435; 180/271; 701/300; 701/301

(58) Field of Classification Search
None
See application file for complete search history.

(56) References Cited

U.S. PATENT DOCUMENTS

| | | | | |
|---|---|---|---|---|
| 6,459,988 | B1 * | 10/2002 | Fan et al. | 701/468 |
| 7,289,786 | B2 * | 10/2007 | Krasner | 455/404.2 |
| 7,523,000 | B2 * | 4/2009 | Tengler et al. | 701/301 |
| 7,545,261 | B1 * | 6/2009 | Harrington | 340/435 |
| 2006/0220802 | A1 * | 10/2006 | Shinoda | 340/426.18 |
| 2007/0018797 | A1 * | 1/2007 | Chen et al. | 340/425.5 |
| 2007/0161355 | A1 * | 7/2007 | Zeng | 455/99 |
| 2007/0171850 | A1 * | 7/2007 | Feder et al. | 370/311 |
| 2008/0096553 | A1 * | 4/2008 | Saksena et al. | 455/426.2 |

FOREIGN PATENT DOCUMENTS

| | | |
|---|---|---|
| JP | 2000-231681 | 8/2000 |
| JP | 2002-111903 | 4/2002 |
| JP | 2004-40682 | 2/2004 |
| JP | 2007-183865 | 7/2007 |
| JP | 2009-260540 | 11/2009 |

OTHER PUBLICATIONS

Office Action dated Dec. 25, 2012 in the corresponding JP Application No. 2010-027560 with English translation thereof.

* cited by examiner

*Primary Examiner* — George Bugg
*Assistant Examiner* — Renee Dorsey
(74) *Attorney, Agent, or Firm* — Harness, Dickey & Pierce, PLC

(57) ABSTRACT

When determining a collision possibility of a vehicle while an emergency report is not being executed, an in-vehicle emergency report apparatus secures a wireless communications resource by one of the following: (i) Rejecting a connection request for connecting a wireless communications link from a navigation system to a wireless communications device in respect of another use other than an emergency report; (ii) Disconnecting the wireless communications link connected by the wireless communications device according to a connection request from the navigation system in respect of another use other than an emergency report; (iii) Notifying the navigation system of prohibition of connecting the wireless communications link by the wireless communications device in another use other than an emergency report; and (iv) Restricting a connection band of the wireless communications link in the wireless communications device in respect of another use other than an emergency report from the navigation system.

13 Claims, 3 Drawing Sheets

IN-VEHICLE EMERGENCY REPORT APPARATUS

CROSS REFERENCE TO RELATED APPLICATION

The present application is based on and incorporates herein by reference Japanese Patent Application No. 2010-27560 filed on Feb. 10, 2010.

FIELD OF THE INVENTION

The present invention relates to an in-vehicle emergency report apparatus which can transmit an emergency report signal when a start trigger of an emergency report occurs.

BACKGROUND OF THE INVENTION

[Patent document 1] JP-2000-231681 A

For instance, Patent document 1 recites an in-vehicle emergency report apparatus that transmits an emergency report signal from a wireless communications device to a center apparatus in a service center via a mobile communications network after an air bag is inflated because of a vehicle collision.

The above-mentioned in-vehicle emergency report apparatus operates as follows. There is a case that an air bag is inflated in a duration for which a wireless communications device is executing wireless communications via the mobile communications network for another usage other than the emergency report. In such a case, the wireless communications device disconnects the wireless communications link used for the other usage, connects a wireless communications link with a center apparatus, and then transmits an emergency report signal to the center apparatus via the mobile communications network. Under such a configuration, the time for the wireless communications device to disconnect the wireless communications link for the other usage becomes a delay time up to the transmission of the emergency report signal. The emergency report signal cannot be thus promptly transmitted from the wireless communications device, posing a problem that an emergency report cannot be carried out quickly.

SUMMARY OF THE INVENTION

The present invention is made in view of the above-mentioned situation. It is an object of the present invention to provide an in-vehicle emergency report apparatus that transmits an emergency report signal promptly from a wireless communications device upon an occurrence of a start trigger of an emergency report.

To achieve the above object, according to an example of the present invention, an emergency report apparatus in a vehicle is provided as follows. A wireless communications device is configured to transmit an emergency report signal. A control circuit is configured to execute an emergency report by causing the wireless communications device to transmit an emergency report to transmit an emergency report signal when determining that a start trigger occurred. The control circuit is further configured to, when determining that there is a possibility that the vehicle collides and also an emergency report is not being executed, secure a wireless communications resource for an emergency report to enable an emergency report.

Under such a configuration, when determining a collision possibility of a vehicle while determining that an emergency report is not being executed, a wireless communications resource is secured for an emergency report. Such a configuration enables the securement of the state in which an emergency report signal is ready to be transmitted promptly. When a start trigger of an emergency report then occurs, without need of disconnecting any wireless communications link connected for another use other than an emergency report, an emergency report signal can be thus promptly transmitted from the wireless communications device, enabling an emergency report to be started promptly.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
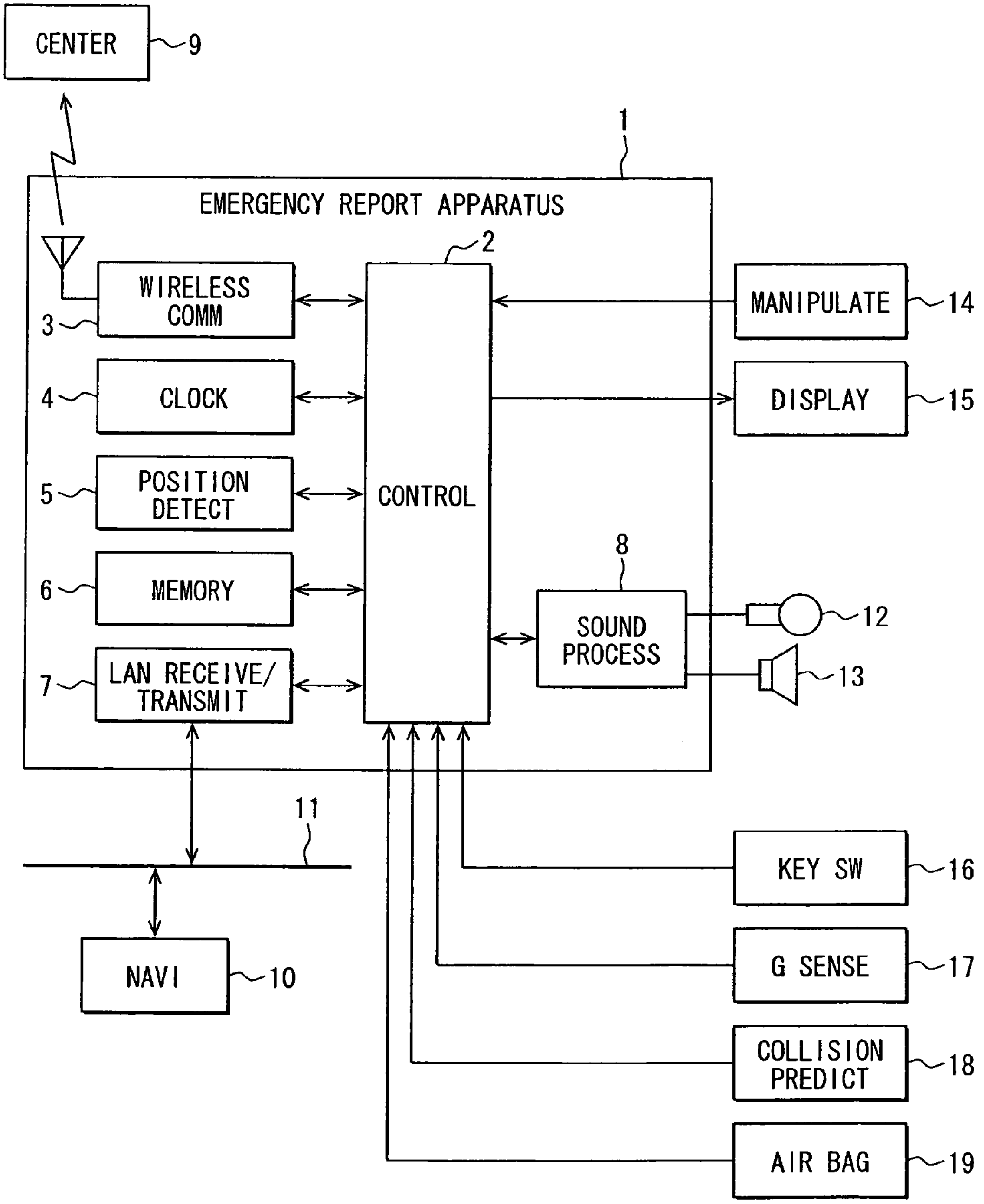
FIG. 1 is a functional block diagram according to a first embodiment of the present invention.
Figure 2:
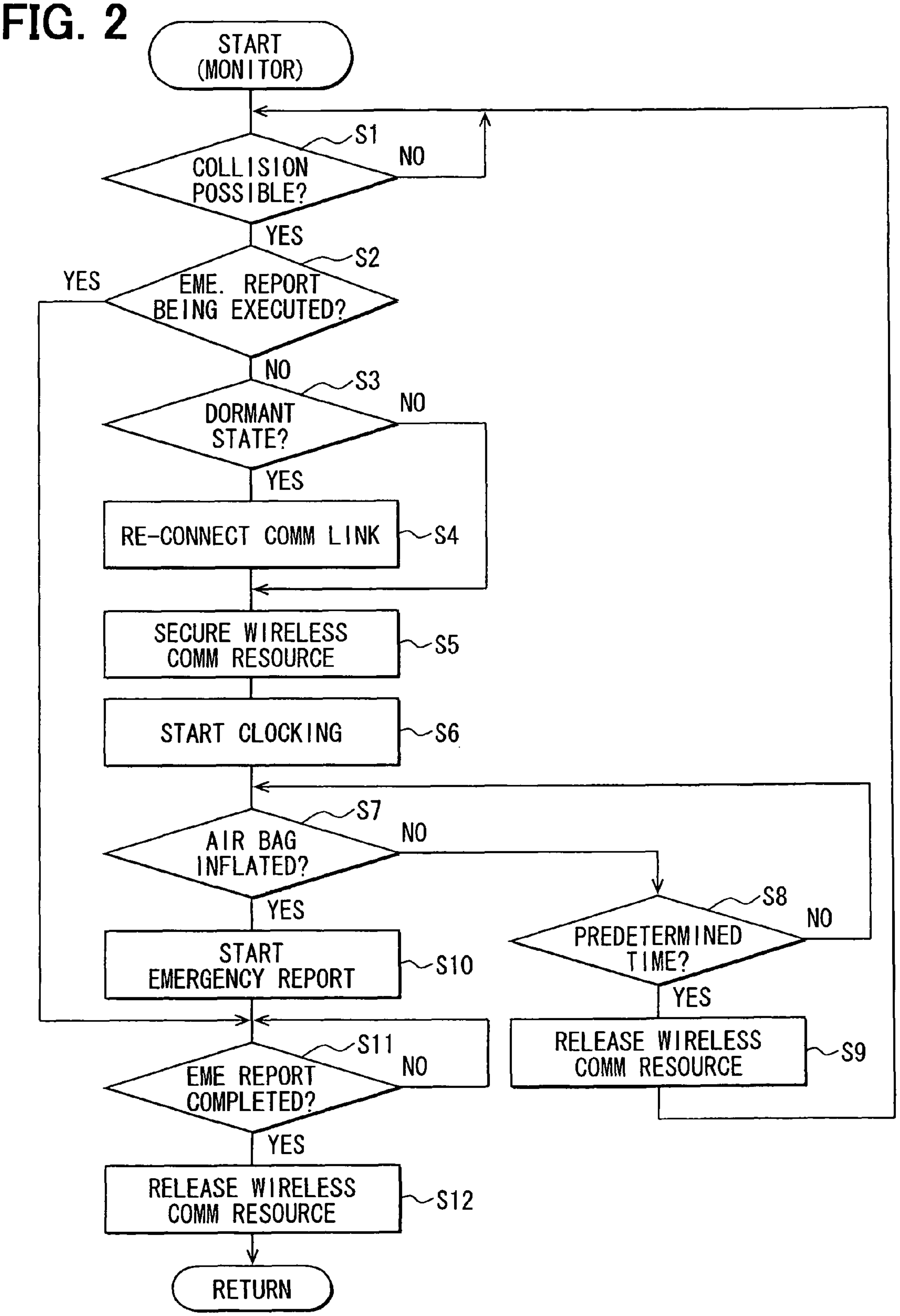
FIG. 2 is a flowchart diagram according to the first embodiment.

A first embodiment according to the present invention is explained with reference to FIGS. 1, 2. FIG. 1 illustrates a function block diagram of an overall configuration of an in-vehicle emergency report apparatus 1 according to the first embodiment. The in-vehicle emergency report apparatus 1 is mounted in a subject vehicle and includes the following: a control circuit 2 (also referred to as a control means or device), a wireless communications device 3 (also referred to as a wireless communications means), a clock device 4, a position detection device 5, a memory device 6, a LAN (Local Area Network) transmission and reception device 7, and a sound processing device 8. The control circuit 2 includes mainly a well-known microcomputer which contains a CPU, a ROM, and a RAM; it controls an overall operation of the in-vehicle emergency report apparatus 1. The wireless communications device 3 executes wireless communications via a mobile communications network with a cellular phone, which (not shown) that a user carries, or a center apparatus 9 installed in a service center.

The clock device 4 starts clocking upon receiving a clocking start signal from the control circuit 2, ends the clocking in a predetermined duration (time is up), and outputs a clocking end signal to the control circuit 2. The position detection device 5 receives a vehicle position acquisition signal from the control circuit 2, calculates a parameter of a GPS electric wave received from a GPS Satellite, and outputs a vehicle position to the control circuit 2. The LAN transmission and reception device 7 is connected with various systems such as a navigation system 10 and various ECUs via an in-vehicle LAN 11. The sound processing device 8 carries out sound processing for a reception sound, which is outputted via a speaker 13, while carrying out sound processing for a transmission sound, which is inputted via a microphone 12.

A manipulation apparatus 14 is provided to be an independent body different and separated from the in-vehicle emergency report apparatus 1; it outputs a manipulation detection signal indicating a reception of a manipulation of a user or occupant in the vehicle to the control circuit 2 when receiving the manipulation. The manipulation apparatus 14 includes a hardware key section or a touch sensitive panel formed on a display screen of a display apparatus 15. The display apparatus 15 is provided to be an independent body different and separated from the in-vehicle emergency report apparatus 1; for example, it includes a liquid crystal display device. The display apparatus 15 displays display information based on a display instruction signal, which is inputted from the control circuit 2.

The memory device 6 stores a variety of information and a history record of vehicle positions in the past acquired by the position detection device 5. The number of vehicle positions which can be stored by the memory device 6 is predetermined as a maximum record number. When a new vehicle position is stored in the state that the vehicle positions of the maximum record number are stored, the oldest vehicle position among the vehicle positions of the maximum record number stored at that time while the new vehicle position is stored.

A key switch 16 outputs to the control circuit 2 an IG signal which indicates an ON/OFF state of IG (ignition) switch or an ACC signal which indicates an ON/OFF state of an ACC (accessory) switch. In cases that the control circuit 2 determines that the IG switch is in the ON state based on the inputted IG signal or that the ACC switch is in the ON state based on the inputted ACC signal, the control circuit 2 causes the in-vehicle emergency report apparatus 1 to turn into a power ON state to carry out a usual operation. In cases that the control circuit 2 determines that the IG switch is in the OFF state based on the inputted IG signal or the ACC switch is in the OFF state based on the inputted IG signal, the control circuit 2 causes the in-vehicle emergency report apparatus 1 to turn into a power OFF state to carry out a low power consumption operation.

A G sensor 17 detects an acceleration applied to the vehicle, and outputs an acceleration signal, which indicates the detected acceleration, to the control circuit 2. A collision prediction system 18 is provided with various sensors such as a radar and a camera. The collision prediction system 18 outputs a collision prediction signal which indicates whether the vehicle may collide, for example, with a leading vehicle based on the detection results of the various sensors. When the airbag system 19 inflates an air bag, the collision detection signal which indicates that the air bag is inflated is outputted to the control circuit 2.

In the above-mentioned in-vehicle emergency report apparatus 1, the control circuit 2 receives a collision detection signal from the airbag system 19, to thereby determine that the airbag system 19 has inflated the air bag (in other words, determining that a start trigger of an emergency report has occurred). The control circuit 2 causes the wireless communications device 3 to transmit an emergency report signal including a vehicle position and user information to the center apparatus 9 via the mobile communications network. Upon receiving the emergency report signal transmitted from the in-vehicle emergency report apparatus 1, the center apparatus 9 transmits a reply signal to the in-vehicle emergency report apparatus 1 so as to notify the user of the reception of the emergency report signal. When a predetermined time period elapses since transmitting of the reply signal to the in-vehicle emergency report apparatus 1, the center apparatus 9 transmits a voice call signal to the in-vehicle emergency report apparatus 1 to connect a voice call communications link between an operator and the user.

In the in-vehicle emergency report apparatus 1, upon determining that the voice call signal transmitted from the center apparatus 9 is received by the wireless communications device 3 via the mobile communications network, the control circuit 2 transmits a reply signal responding to the voice call signal to the center apparatus 9 via the mobile communications network from the wireless communications device 3, connecting the voice call communications link with the center apparatus 9. Thus, connecting of the voice call communications link between the in-vehicle emergency report apparatus 1 and the center apparatus 9 enables the user to have a conversation with the operator stationed in the service center using the microphone 12 and the speaker 13. This further enables an oral request for a rescue or a report of a degree of an accident.

Moreover, the present embodiment illustrates the configuration where the position detection device 5 carries out autonomous positioning to acquire a vehicle position. Without need to be limited thereto, another technique may be adopted. For instance, the LAN transmission and reception device 7 may receive a vehicle position transmitted from the navigation system 10 via the in-vehicle LAN 11. Thereby, the vehicle, position may be used which the navigation system 10 acquires by calculating the parameter extracted from the GPS electric wave. In this case, the comparison is made between the vehicle position acquired by the position detection device 5 using the autonomous positioning manner and the vehicle position acquired by the navigation system 10. The latter is acquired by further using the detection result of the speed signal or gyro sensor or detection result of the acceleration sensor as well as amending through the map matching process; thus, the latter has an accuracy in position higher than the former.

An operation under the above configuration is explained with reference to FIG. 2. FIG. 2 illustrates a flowchart of a process executed by the control circuit 2. It is noted that a flowchart or the processing of the flowchart in the present application includes sections (also referred to as steps), which are represented, for instance, as S1. Further, each section can be divided into several sub-sections while several sections can be combined into a single section. Furthermore, each of thus configured sections can be referred to as a means or unit and achieved not only as a software device but also as a hardware device. In the in-vehicle emergency report apparatus 1, the control circuit 2 operates as follows. When the in-vehicle emergency report apparatus 1 is in a power ON state, a collision prediction monitoring process to determine a collision possibility is executed to monitor by determining whether there is a possibility that the subject vehicle collides or not (S1). In detail, the control circuit 2 is monitoring whether at least one of the following three conditions is satisfied: (i) a collision prediction signal is inputted from the collision prediction system 18, (ii) an acceleration in the vehicle deceleration direction is equal to or greater than a predetermined value, the acceleration which is obtained based on an acceleration signal inputted from the G sensor 17, and (iii) an acceleration in the vehicle deceleration direction is equal to or greater than a predetermined value, the acceleration which is obtained by calculation based on a speed signal periodically received by the LAN transmission and reception device 7 via the in-vehicle LAN 11 from the navigation system 10.

The control circuit 2 determines that any one of the above-mentioned three conditions is satisfied, thereby determining that there is a possibility that the vehicle collides (S1: YES). It is then determined whether it is in a state where an emergency report is being executed at the time (S2). When it is determined that it is not in a state where an emergency report is being executed at the time (S2: NO), it is determined whether the wireless communications device 3 is in a dormant state (S3).

When the control circuit 2 determines that the wireless communications device 3 is not in the dormant state at the time (S3: NO), a wireless communications resource for an emergency report is secured (S5). In contrast, when determining that the wireless communications device 3 is in the dormant state at the time (S3: YES), the control circuit 2 causes the wireless communications device 3 to re-connect the wireless communications link so that the wireless communications device 3 is returned from the dormant state (S4). Then, a wireless communications resource for an emergency report is secured (S5). In detail, the control circuit 2 secures a wireless communications resource for an emergency report by one of the followings: (i) Rejecting a connection request for connecting a wireless communications link from the navigation system 10 to the wireless communications device 3 in respect of another use (for example, downloading of map data, etc.) other than an emergency report; (ii) Disconnecting the wireless communications link connected by the wireless communications device 3 according to a connection request from the navigation system 10 in respect of another use other than an emergency report; (iii) Notifying the navigation system 10 of prohibition of connecting the wireless communications link by the wireless communications device 3 in respect of another use other than an emergency report; and (iv) Restricting the connection band (throughput) of the wireless communications link in the wireless communications device 3 in respect of another use other than an emergency report from the navigation system 10.

Next, the control circuit 2 outputs a clocking start signal to the clock device 4 so that the clock device 4 starts clocking (S6). While monitoring (i) a collision detection signal from the airbag system 19 and (ii) a clocking end signal from the clock device 4, the control circuit 2 determines whether a predetermined time elapses (S7, S8). The above predetermined time may be desirably defined as being longer than a time taken for the vehicle to collide and to inflate an air bag after determining the collision possibility of the vehicle.

When it is determined that the clocking end signal is received from the clock device 4 before the collision detection signal is received from the airbag system 19 (S7: NO and S8: YES), namely, when it is determined that the collision has been avoided and the air bag did not inflate, the control circuit 2 releases the secured wireless communications resource for an emergency report (S9), returning the processing to S1. In detail, the control circuit 2 releases the secured wireless communications resource for an emergency report by one of the followings: (i) Accepting a connection request for connecting a wireless communications link from the navigation system 10 to the wireless communications device 3 in respect of another use other than an emergency report; (ii) Notifying the navigation system 10 of permission of connecting the wireless communications link by the wireless communications device 3 in respect of another use other than an emergency report; and (iii) Releasing the restricted connection band of the wireless communications link in the wireless communications device 3 in respect of another use other than an emergency report from the navigation system 10.

In contrast, when the control circuit 2 determines that the collision detection signal is received from the airbag system 19 before the clocking end signal is received from the clock device 4 (S7: YES), the control circuit 2 causes the wireless communications device 3 to transmit an emergency report signal including a vehicle position and user information to the center apparatus 9 via the mobile communications network, thereby starting the emergency report (S10). Next, the control circuit 2 determines whether the emergency report is completed (S11). When it is determined that the emergency report is completed (S11: YES), the control circuit 2 releases the secured wireless communications resource for an emergency report (S12), thereby ending a series of the present process.

In the above explanation, a vehicle collision possibility is determined when one of the following several conditions is satisfied: (i) a collision prediction signal is inputted from the collision prediction system 18, (ii) an acceleration in the vehicle deceleration direction is equal to or greater than a predetermined value, the acceleration which is obtained based on an acceleration signal inputted from the G sensor 17, and (iii) an acceleration in the vehicle deceleration direction is equal to or greater than a predetermined value, the acceleration which is obtained by calculation based on a speed signal periodically received by the LAN transmission and reception device 7 via the in-vehicle LAN 11 from the navigation system 10. Without need to be limited thereto, the determination of the collision possibility may be made based on a combination (i.e., more than one) of the above several conditions.

Further, securing of the wireless communications resource may be made by a combination (i.e., more than one) of the above-mentioned and following actions: (i) Accepting a connection request for connecting a wireless communications link from the navigation system 10 to the wireless communications device 3 in respect of another use other than an emergency report; (ii) Disconnecting the wireless communications link connected by the wireless communications device 3 according to a connection request from the navigation system 10 in respect of another use other than an emergency report; (iii) Notifying the navigation system 10 of prohibition of connecting the wireless communications link by the wireless communications device 3 in another use other than an emergency report; and (iv) Restricting the connection band of the wireless communications link in the wireless communications device 3 in respect of another use other than an emergency report from the navigation system 10. Furthermore, similarly, releasing of the wireless communications resource for an emergency report may be made by a combination (i.e., more than one) of the above-mentioned and following actions: (i) Accepting a connection request for connecting a wireless communications link from the navigation system 10 to the wireless communications device 3 in respect of another use other than an emergency report; (ii) Notifying the navigation system 10 of permission of connecting the wireless communications link by the wireless communications device 3 in another use other than an emergency report; and (iii) Releasing the restricted connection band of the wireless communications link in the wireless communications device 3 in respect of another use other than an emergency report from the navigation system 10.

As the explained above, the in-vehicle emergency report apparatus 1 or control circuit 2 according to the first embodiment operates as follows: When determining at the same time both of (i) the presence of the collision possibility and (ii) the state of not executing an emergency report, the wireless communications resource for an emergency report is secured. Such a configuration enables the securement of the state in which an emergency report signal is ready to be transmitted promptly. When an air bag is then inflated, without need of disconnecting any wireless communications link connected for another use other than an emergency report, an emergency report signal can be thus promptly transmitted from the wireless communications device, enabling an emergency report to be started promptly. Moreover, after securing the wireless communications resource for an emergency report, it is determined whether the air bag is inflated. Such a configuration enables the pre-securement of the wireless communications resource prepared for the inflation of an air bag, enabling an emergency report to be started more promptly.

Second Embodiment

Figure 3:
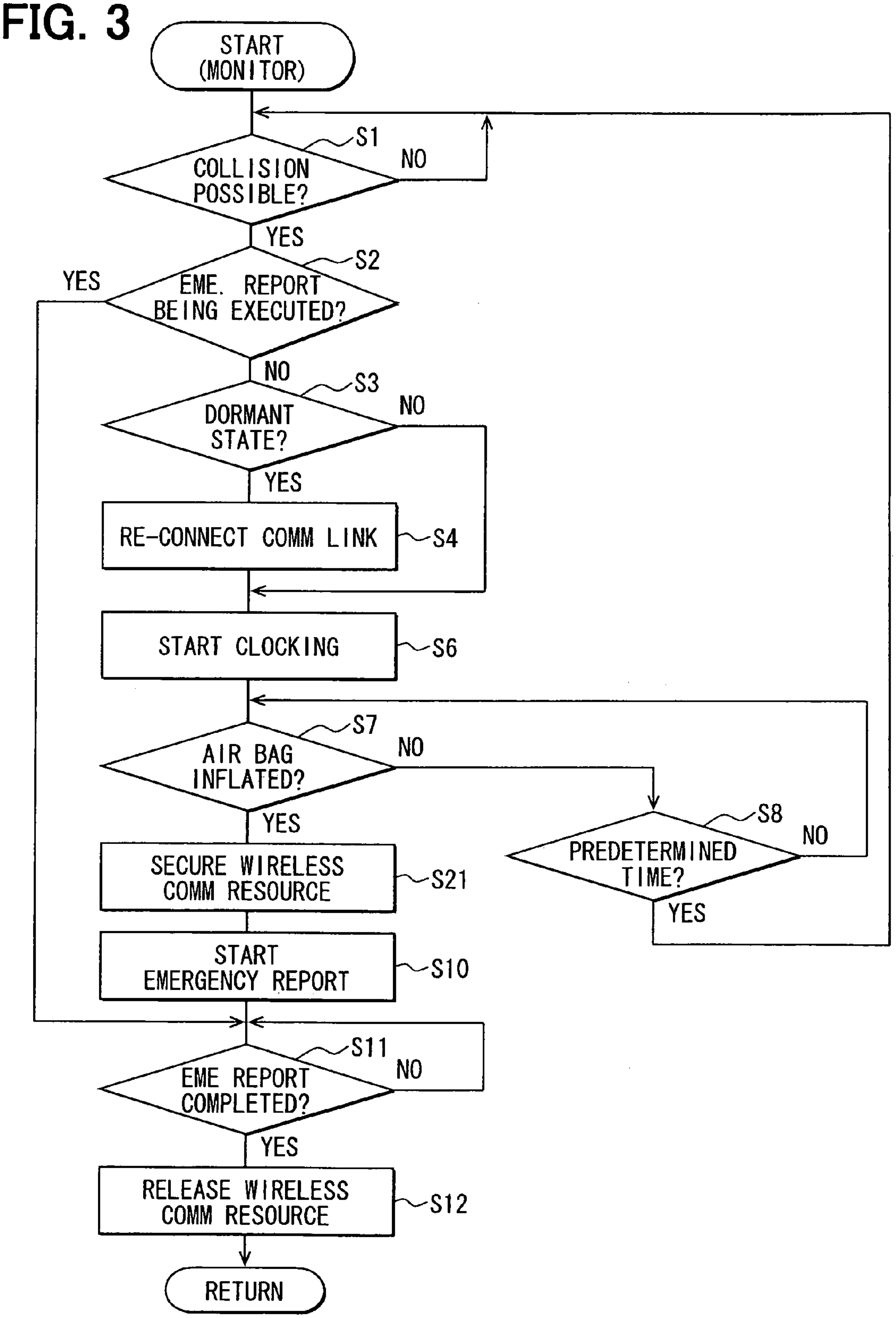
FIG. 3 is a flowchart diagram according to a second embodiment of the present invention.

A second embodiment according to the present invention is explained with reference to FIG. 3. In addition, explanation is omitted for the same parts as those in the first embodiment and made for the different parts from the first embodiment. In the second embodiment, under the condition that an air bag was inflated, the wireless communications resource for an emergency report is secured.

That is, the control circuit 2 determines that there is a possibility that the vehicle collides (S1: YES), and determines that any emergency report is not being executed (S2: NO). Thereafter, the control circuit 2 starts clocking using the clock device 4 (S6), without securing a wireless communications resource for an emergency report. When the control circuit 2 determines that the collision detection signal is received from the airbag system 19 before the clocking end signal is received from the clock device 4 (S7: YES), the wireless communications resource for an emergency report is secured (S21). The control circuit 2 causes the wireless communications device 3 to transmit an emergency report signal including a vehicle position and user information to the center apparatus 9 via the mobile communications network, thereby starting the emergency report (S10). When it is determined that the emergency report is completed (S11: YES), the control circuit 2 releases the secured wireless communications resource for an emergency report (S12), thereby ending a series of the present process.

As explained above, in the in-vehicle emergency report apparatus 1 according to the second embodiment, the following is provided. Even if it is determined that there is a possibility of a vehicle collision, a wireless communications resource for an emergency report is not secured. Instead, after determining that an air bag was inflated, a wireless communications resource for an emergency report is secured. Such a configuration enables the securement of a wireless communications resource only when an emergency report is necessary. Moreover, such a configuration can prevent an once secured wireless communications resource for an emergency report from being released because of no longer need to execute an emergency report.

Other Embodiments

The present invention is not limited only to the above-mentioned embodiments, and can be modified or extended as follows. For instance, a trigger of an emergency report may be an event by a user pressing a button for starting an emergency report, other than an inflation of an air bag. Moreover, the following two processes of the first embodiment and second embodiment may be selectively used: the first one where after securing the wireless communications resource for an emergency report, it is determined whether the air bag is inflated (under the first embodiment); and the second one where after determining that an air bag was inflated, a wireless communications resource for an emergency report is secured (under the second embodiment). For instance, the first one may be adopted in the following situations: when a possibility that the vehicle collides is great (certain), when the degree of the injury assumed when the vehicle collides is great (acceleration is very great), or When the priority of the emergency report needs to be raised. In contrast, the second one may be adopted in the following situations: when a possibility that the vehicle collides is small (uncertain), when the degree of the injury assumed when the vehicle collides is small, or when the priority of the emergency report does not need to be raised.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory, computer-readable storage media.

Aspects of the disclosure described herein are set out in the following clauses.

As an aspect of the disclosure, an emergency report apparatus in a vehicle is provided as follows. A wireless communications device is configured to transmit an emergency report signal. A control circuit is configured to execute an emergency report by causing the wireless communications device to transmit an emergency report to transmit an emergency report signal when determining that a start trigger occurred. The control circuit is further configured to, when determining that there is a possibility that the vehicle collides and also an emergency report is not being executed, secure a wireless communications resource for an emergency report to enable an emergency report.

As an optional aspect, in the emergency report apparatus: when determining that there is a possibility that the vehicle collides and also an emergency report is not being executed, the control circuit may determine whether the wireless communications device is in a dormant state; and when it is determined that the wireless communications device is in the dormant state, the control circuit may cause the wireless communications device to re-connect the wireless communications link to be returned from the dormant state, securing a wireless communications resource for an emergency report.

Thus, even if the wireless communications device is in the dormant state, the wireless communications device re-connects the wireless communications link to be returned from the dormant state, securing a wireless communications resource for an emergency report. Such a configuration enables the securement of the state in which an emergency report signal is ready to be transmitted promptly.

As an optional aspect, in the emergency report apparatus: the control circuit may determine whether a start trigger of an emergency report occurs after securing the wireless communications resource for an emergency report; and the control circuit may cause the wireless communications device to transmit an emergency report signal when it is determined that the start trigger of the emergency report occurred.

Thus, when a start trigger of an emergency report occurs, a wireless communications resource has been already secured for an emergency report, enabling an emergency report to be started more promptly.

As an optional aspect, in the emergency report apparatus: the control circuit may secure the wireless communications resource for an emergency report after determining that the start trigger of the emergency report occurred; and the control circuit may cause the wireless communications device to transmit the emergency report signal. Thus, even if it is determined that there is a possibility of a vehicle collision, a wireless communications resource for an emergency report is not secured. Only when an emergency report is necessary (i.e., when a start trigger of an emergency report occurs), the wireless communications resource can be secured for the emergency report. Moreover, such a configuration can prevent an once secured wireless communications resource for an emergency report from being released because of no longer need to execute an emergency report.

As optional aspect, in the emergency report apparatus, the control circuit may execute selectively one of two first and second operations. Herein, the first operation determines whether a start trigger of an emergency report occurs after securing the wireless communications resource for an emergency report; the second operation secures the wireless communications resource for an emergency report after determining that the start trigger of the emergency report occurred.

Thus, for example, when a possibility that the vehicle collides is great (certain), when the degree of the injury assumed when the vehicle collides is great (acceleration is very great), when the priority of the emergency report needs to be raised, the first operation determining whether a start trigger of an emergency report occurs after securing the wireless communications resource for an emergency report may be adopted. In contrast, when a possibility that the vehicle collides is small (uncertain), when the degree of the injury assumed when the vehicle collides is small, or when the priority of the emergency report does not need to be raised, the second operation securing the wireless communications resource for an emergency report after determining that the start trigger of the emergency report occurred may be adopted. Thus, according to the situation, two operations are selectively adopted.

It will be obvious to those skilled in the art that various changes may be made in the above-described embodiments of the present invention. However, the scope of the present invention should be determined by the following claims.

What is claimed:

1. An emergency report apparatus in a vehicle, the apparatus comprising:

a wireless communications device to transmit an emergency report signal; and a control circuit to execute an emergency report by causing the wireless communications device to transmit the emergency report signal when determining that a start trigger occurred, the control circuit being further configured to, when determining that there is a possibility that the vehicle will collide in the future and also the emergency report is not being executed, secure a wireless communications resource exclusively to enable the emergency report following the determination of the possibility that the vehicle will collide in the future and the non-execution of the emergency report;

determine whether the start trigger of the emergency report occurs after securing the wireless communications resource for the emergency report; and cause the wireless communications device to transmit the emergency report signal when it is determined that the start trigger of the emergency report occurred.

2. The emergency report apparatus according to claim 1, wherein:

when determining that there is the possibility that the vehicle will collide and also the emergency report is not being executed, the control circuit determines whether the wireless communications device is in a dormant state; and when it is determined that the wireless communications device is in the dormant state, the control circuit causes the wireless communications device to re-connect the wireless communications link to be returned from the dormant state, securing the wireless communications resource for the emergency report.

3. The emergency report apparatus according to claim 1, wherein:

the control circuit secures the wireless communications resource for the emergency report after determining that the start trigger of the emergency report occurred; and the control circuit causes the wireless communications device to transmit the emergency report signal.

4. The emergency report apparatus according to claim 1, wherein the control circuit executes selectively one of two first and second operations, the first operation determining whether the start trigger of the emergency report occurs after securing the wireless communications resource for the emergency report, the second operation securing the wireless communications resource for the emergency report after determining that the start trigger of the emergency report occurred.

5. The emergency report apparatus according to claim 1, wherein the control circuit secures the wireless communications resource for the emergency report to enable the emergency report by rejecting a connection request of the wireless communications link to the wireless communications device in another use other than the emergency report.

6. The emergency report apparatus according to claim 1, wherein the control circuit secures the wireless communications resource for the emergency report to enable the emergency report by disconnecting any wireless communications link connected for another use other than the emergency report.

7. The emergency report apparatus according to claim 1, wherein the control circuit secures the wireless communications resource for the emergency report to enable the emergency report by notifying prohibition of connecting the wireless communications link in the wireless communications device in another use other than the emergency report.

8. The emergency report apparatus according to claim 1, wherein the control circuit secures the wireless communications resource for the emergency report to enable the emergency report by restricting a connection band of the wireless communications link in the wireless communications device in another use other than the emergency report.

9. The emergency report apparatus according to claim 2, wherein:

the control circuit determines whether the start trigger of the emergency report occurs after securing the wireless communications resource for the emergency report; and the control circuit causes the wireless communications device to transmit the emergency report signal when it is determined that the start trigger of the emergency report occurred.

10. The emergency report apparatus according to claim 2, wherein:

the control circuit secures the wireless communications resource for the emergency report after determining that the start trigger of the emergency report occurred; and the control circuit causes the wireless communications device to transmit the emergency report signal.

11. The emergency report apparatus according to claim 2, wherein the control circuit executes selectively one of two first and second operations, the first operation determining whether the start trigger of the emergency report occurs after securing the wireless communications resource for the emergency report, the second operation securing the wireless communications resource for the emergency report after determining that the start trigger of the emergency report occurred.

12. The emergency report apparatus according to claim 2, wherein the control circuit releases the wireless communications resource if the start trigger of the emergency report has not occurred within a predetermined amount of time.

13. The emergency report apparatus according to claim 1, wherein the control circuit releases the wireless communications resource if the start trigger of the emergency report has not occurred within a predetermined amount of time.

* * * * *